US012798214B2

(12) United States Patent
Thai et al.

(10) Patent No.: US 12,798,214 B2
(45) Date of Patent: Nov. 17, 2026

(54) POROSITY GRADIENT PREFORM ARCHITECTURE FOR HIGH TEMPERATURE COMPOSITES

(71) Applicant: Rohr, Inc., Chula Vista, CA (US)

(72) Inventors: Bryan Thai, Poway, CA (US); Vijay V. Pujar, San Diego, CA (US); Katherine E. Waugh, Coronado, CA (US); Christopher C. Koroly, Spring Valley, CA (US)

(73) Assignee: GOODRICH CORPORATION, Charlotte, NC (US)

( * ) Notice: Subject to any disclaimer, the term of this patent is extended or adjusted under 35 U.S.C. 154(b) by 221 days.

(21) Appl. No.: 18/357,026

(22) Filed: Jul. 21, 2023

(65) Prior Publication Data

US 2025/0026104 A1 Jan. 23, 2025

(51) Int. Cl.
*B32B 5/26* (2006.01)
*B32B 5/02* (2006.01)
(Continued)

(52) U.S. Cl.
CPC .................. *B32B 5/26* (2013.01); *B32B 5/02* (2013.01); *B32B 37/06* (2013.01); *B32B 37/20* (2013.01);
(Continued)

(58) Field of Classification Search
CPC . C04B 38/007; C04B 38/061; C04B 38/0605; C04B 2237/385;
(Continued)

(56) References Cited

U.S. PATENT DOCUMENTS 5,536,562 A 7/1996 Tran et al.
9,550,341 B2 1/2017 Loukus et al.
(Continued)

FOREIGN PATENT DOCUMENTS

CN 107130133 2/2019
EP 3178637 6/2017
(Continued)

OTHER PUBLICATIONS

USPTO; Requirement for Restriction/ Election dated Mar. 26, 2025 in U.S. Appl. No. 18/356,995.
(Continued)

*Primary Examiner* — Camie S Thompson
(74) *Attorney, Agent, or Firm* — SNELL & WILMER L.L.P.

(57) ABSTRACT

A porosity gradient fibrous preform includes a first fabric-resin layer having a first plurality of fibers and a first resin and a second fabric-resin layer having a second plurality of fibers and a second resin. The second fabric-resin layer is positioned further outward from the center of the porosity gradient fibrous preform than the first fabric-resin layer. In response to the porosity gradient fibrous preform being heated to a curing temperature, the first resin and/or the second resin is configured to separate into a fusible resin and a plurality of fugitive pore formers. Accordingly, a volume of the fugitive pore formers sequentially increases from a center of the porosity gradient fibrous preform toward an outer surface of the porosity gradient fibrous preform.

20 Claims, 6 Drawing Sheets

(51) Int. Cl.
*B32B 37/06* (2006.01)
*B32B 37/20* (2006.01)

(52) U.S. Cl.
CPC ... *B32B 2260/023* (2013.01); *B32B 2260/046* (2013.01); *B32B 2305/026* (2013.01); *B32B 2305/076* (2013.01)

(58) Field of Classification Search
CPC ...... C04B 2237/586; C04B 2235/5248; C04B 2235/5252; C04B 2235/775; C04B 2111/00922; C04B 38/0645; C04B 35/52; C04B 35/80; C04B 35/83; C04B 35/0022; B32B 2305/026; B32B 2305/076; B32B 2260/023; B32B 2260/046; B32B 27/06; B32B 27/20; B32B 18/00; B32B 5/26; B32B 5/02; B29B 11/16
USPC .......................................................... 442/336
See application file for complete search history.

(56) References Cited

U.S. PATENT DOCUMENTS

| | | | |
|---|---|---|---|
| 9,850,174 B2 | 12/2017 | Corman et al. | |
| 10,822,280 B2 | 11/2020 | Harris et al. | |
| 2007/0087120 A1 | 4/2007 | Grant et al. | |
| 2011/0150663 A1 | 6/2011 | Manicke et al. | |
| 2013/0045370 A1 | 2/2013 | Aho et al. | |
| 2013/0071603 A1 | 3/2013 | Watson | |
| 2017/0015595 A1 | 1/2017 | Corman et al. | |
| 2018/0002238 A1 | 1/2018 | Shapiro et al. | |
| 2020/0152989 A1 | 5/2020 | Sassin et al. | |
| 2022/0169574 A1 | 6/2022 | Shim et al. | |
| 2023/0192561 A1 | 6/2023 | Lenz et al. | |
| 2023/0193541 A1 | 6/2023 | Lenz et al. | |
| 2025/0026049 A1 * | 1/2025 | Thai | B29C 44/025 |

FOREIGN PATENT DOCUMENTS

| | | |
|---|---|---|
| JP | H0985866 | 3/1997 |
| WO | 9511797 | 5/1995 |
| WO | 0035669 | 6/2000 |
| WO | 2022266445 | 12/2022 |

OTHER PUBLICATIONS

USPTO; Final Office Action dated Feb. 7, 2025 in U.S. Appl. No. 18/356,953.

USPTO; Requirement for Restriction/ Election dated Aug. 15, 2024 in U.S. Appl. No. 18/356,953.

Leguizamon, et al., "Polymerization-Induced Phase Separation in Rubber-Toughened Amine-Cured Epoxy Resins: Tuning Morphology from the Nano- to Macro-scale", https://pubs.acs.org/doi/10.1021/acs.macromol.1c01208, Macromolecules 2021, 54 (17), ACS Publications, American Chemical Society, 2021, 54, pp. 7796-7807.

USPTO; Final Office Action dated Jul. 15, 2025 in U.S. Appl. No. 18/356,953.

European Patent Office, European Search Report dated Jan. 9, 2025 in Application No. 241895853.

European Patent Office, European Search Report dated Jan. 14, 2025 in Application No. 24189587.9.

European Patent Office, European Search Report dated Dec. 19, 2024 in Application No. 24189598.6.

European Patent Office, European Search Report dated Dec. 13, 2024 in Application No. 24189591.1.

European Patent Office, European Office Action dated Nov. 26, 2025 in Application No. 24189598.6.

European Patent Office, European Office Action dated Nov. 26, 2025 in Application No. 24189591.1.

USPTO; Final Office Action dated Dec. 22, 2025 in U.S. Appl. No. 18/356,984.

USPTO; Advisory Action dated Nov. 13, 2025 in U.S. Appl. No. 18/356,953.

USPTO; Requirement for Restriction dated Oct. 17, 2025 in U.S. Appl. No. 18/356,984.

USPTO; Non-Final Office Action dated Sep. 11, 2025 in U.S. Appl. No. 18/356,995.

USPTO; Advisory Action dated Mar. 25, 2026 in U.S. Appl. No. 18/356,984.

USPTO; Final Office Action dated Mar. 24, 2026 in U.S. Appl. No. 18/356,995.

Gissinger et al.. Predicting char yield of high-temperature resins, Carbon, vol. 202, Part 1, 2023, p. 336-347 (Year: 2023).

USPTO; Notice of Allowance dated Aug. 6, 2026 in U.S. Appl. No. 18/356,995.

European Patent Office, European Office Action dated Jul. 15, 2026 in Application No. 241895911.

European Patent Office, European Office Action dated Jul. 15, 2026 in Application No. 241895986.

USPTO; Advisory Action dated Jun. 2, 2026 in U.S. Appl. No. 18/356,995.

USPTO; Non-Final Office Action dated Jun. 25, 2026 in U.S. Appl. No. 18/356,953.

* cited by examiner

POROSITY GRADIENT PREFORM ARCHITECTURE FOR HIGH TEMPERATURE COMPOSITES

FIELD

The present disclosure relates generally to apparatus, systems, and methods of manufacture for composite preform components and, more particularly, to a fibrous preform architecture for high temperature composites.

BACKGROUND

Shaped composite bodies are utilized in aerospace applications. Various systems and methods are known in the art for forming a preform into a shaped composite body. In typical high temperature composite manufacturing, a dry fabric may be used to make a preform. The dry preform is then densified using gas infiltration. There are many variables that determine the success of the densification stage, including the number of available pathways for the gas to infiltrate uniformly into the center of the preform.

SUMMARY

According to various embodiments of the present disclosure, a porosity gradient fibrous preform is provided. The porosity gradient fibrous preform includes a first fabric-resin layer having a first plurality of fibers and a first resin and a second fabric-resin layer having a second plurality of fibers and a second resin. The first fabric-resin layer is positioned further outward from a center of the porosity gradient fibrous preform than the second fabric-resin layer. In response to the porosity gradient fibrous preform being heated to a curing temperature, the first resin is configured to separate into a first fusible resin and a first plurality of fugitive pore formers.

In various embodiments, in response to the porosity gradient fibrous preform being heated to the curing temperature, the second resin is configured to separate into a second fusible resin and a second plurality of fugitive pore formers, wherein a volume of the first plurality of fugitive pore formers is greater than a volume of the second plurality of fugitive pore formers.

In various embodiments, the first plurality of fugitive pore formers and the second plurality of fugitive pore formers are configured to be pyrolyzed from the porosity gradient fibrous preform, and the first plurality of fugitive pore formers and the second plurality of fugitive pore formers are interconnected across the first fabric-resin layer and the second fabric-resin layer such that, in response to being pyrolyzed, a path is created through the porosity gradient fibrous preform for infiltration of a fluid.

In various embodiments, the path creates a porosity gradient in the porosity gradient fibrous preform, and a first porosity of the first fabric-resin layer is greater than a second porosity of the second fabric-resin layer.

In various embodiments, the first plurality of fugitive pore formers includes at least one of a moisture, a solvent, or a fugitive resin.

In various embodiments, a volume of the first plurality of fugitive pore formers is greater than a volume of the second plurality of fugitive pore formers In various embodiments, the first resin includes a first mixture of a fugitive resin and a fusible resin. In various embodiments, the second resin includes a second mixture of the fugitive resin and the fusible resin, and the first mixture includes a first ratio of fugitive resin to fusible resin and the second mixture includes a second ratio of fugitive resin to fusible resin, and the first ratio is greater than the second ratio.

In various embodiments, the first resin and the second resin are the same type of resin.

In various embodiments, a fiber volume of the first plurality of fibers and the second plurality of fibers is the same and a percentage of the fiber volume is at least 25% by volume of the porosity gradient fibrous preform.

According to various embodiments of the present disclosure, a manufacturing method is provided. The manufacturing method includes forming a porosity gradient fibrous preform. The porosity gradient fibrous preform is formed by positioning a first fabric-resin layer over a second fabric-resin layer, the first fabric-resin layer having a first plurality of fibers and a first resin, the second fabric-resin layer having a second plurality of fibers and a second resin, the first fabric-resin layer being positioned further outward from a center of the porosity gradient fibrous preform than the second fabric-resin layer. The porosity gradient fibrous preform is further formed by heating the porosity gradient fibrous preform to a first temperature, and in response to heating the porosity gradient fibrous preform to the first temperature, separating the first resin into two parts including a first fusible resin and a first plurality of fugitive pore formers. The porosity gradient fibrous preform is formed by pyrolyzing the first plurality of fugitive pore formers from the porosity gradient fibrous preform to create a path through the porosity gradient fibrous preform for infiltration of a fluid.

In various embodiments, the manufacturing method further comprises, in response to heating the porosity gradient fibrous preform to the first temperature, separating the second resin into two parts including a second fusible resin and a second plurality of fugitive pore formers, and pyrolyzing the second plurality of fugitive pore formers from the porosity gradient fibrous preform to further create the path through the porosity gradient fibrous preform for infiltration of the fluid.

In various embodiments, a volume of the first plurality of fugitive pore formers is greater than a volume of the second plurality of fugitive pore formers.

In various embodiments, a porosity gradient is formed in the porosity gradient fibrous preform in response to pyrolyzing the first plurality of pore formers and the second plurality of fugitive pore formers from the porosity gradient fibrous preform.

In various embodiments, the first plurality of fugitive pore formers and the second plurality of fugitive pore formers are interconnected across the first fabric-resin layer and the second fabric-resin layer such that, in response to being pyrolyzed, the path is created through the first fabric-resin layer and the second fabric-resin layer.

In various embodiments, the first resin is a first type of resin and the second resin is a second type of resin that is different from the first type of resin.

In various embodiments, the first resin and the second resin are a same type of resin.

In various embodiments, the first plurality of fugitive pore formers includes at least one of a moisture, a solvent, or a fugitive resin.

According to various embodiments of the present disclosure, a manufacturing method is provided. The manufacturing method includes forming a porosity gradient fibrous preform by positioning a second fabric-resin layer over a first fabric-resin layer having a first plurality of fibers and a first resin, the second fabric-resin layer having a second plurality of fibers and a second resin, the second fabric-resin layer being positioned further outward from a center of the porosity gradient fibrous preform than the first fabric-resin layer. The porosity gradient fibrous is further formed by applying a heat to the second fabric-resin layer and the first fabric-resin layer, separating, in response to the heat, the second resin into a first phase including a phase-separated resin and a second phase including a water, curing the phase-separated resin, and evaporating the water so as to create a porosity in the phase-separated resin which is greater than a porosity of the first resin.

In various embodiments, the manufacturing method further comprises pyrolyzing the first fabric-resin layer and the second fabric-resin layer to create a path through the porosity gradient fibrous preform for infiltration of a fluid.

The present disclosure may include any one or more of the individual features disclosed above and/or below alone or in any combination thereof.

The foregoing features and elements may be combined in various combinations without exclusivity, unless expressly indicated herein otherwise. These features and elements as well as the operation of the disclosed embodiments will become more apparent in light of the following description and accompanying drawings.

DETAILED DESCRIPTION

Figure 1B:
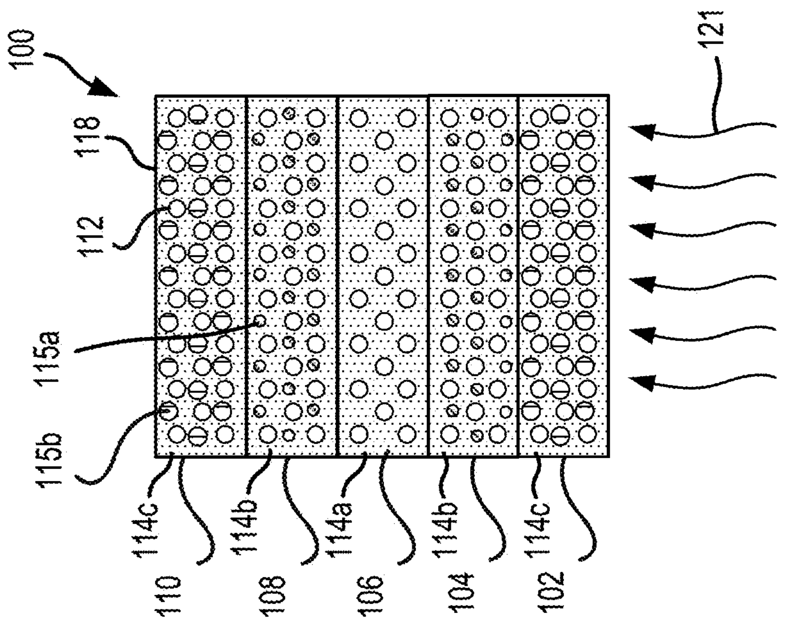
FIG. 1A and FIG. 1B illustrate a porosity gradient fibrous preform using fiber fabric-resin layers having varying types and/or compositions of resins and undergoing a curing process, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an," or "the" may include one or more than one and that reference to an item in the singular may also include the item in the plural. Further, all ranges may include upper and lower values and all ranges and ratio limits disclosed herein may be combined.

Various systems and methods are known in the art for generating a fibrous preform for carbon-carbon composites. In typical carbon-carbon manufacturing, a fibrous preform may be manufactured and this fibrous preform may then be densified using gas infiltration. There are many variables that determine the success of the densification stage, including the number of available pathways for the gas to infiltrate uniformly into the center of the fibrous preform. Typically, fiber volume and lack of adequate gas flow paths inhibit uniform densification and yield a component with more than 10 percent porosity.

Disclosed herein are systems and methods for a porosity gradient fibrous preform architecture for high temperature composites that provides numerous pathways for fluids, i.e. uniform gas, infiltration into the center of the porosity gradient fibrous preform during densification. In various embodiments, pore formers of various size and/or type are disposed into fabric-resin layers of, for example, woven fabric-resin layers, non-crimp fabric-resin layers, such as unidirectional or stitched unidirectional, or felt fabric-resin layers. A fibrous preform of the present disclosure includes several fiber-resin layers and features a porosity gradient wherein the preform has a lower porosity at the center of the preform and sequentially higher porosity in a direction away from the center of the preform toward the outer surface of the preform. The gradient may be generated by a size of pores or a number of pores or both. The pores are interconnected to provide a path for subsequent infiltration. Low porosity implies the space is occupied by a non-porous material—e.g., fiber or resin.

As used herein, a fusible fiber or a fusible resin is comprised of one or more polymers with a combined char yield of 25% elemental carbon or greater by weight and a residual mass of less than 1% by weight. As used herein, a fugitive fiber or a fugitive resin is comprised of one or more polymers with a combined char yield of 5% elemental carbon or less by weight, and a residual mass of less than 1% by weight. As used herein, a fugitive pore former is a material with a combined char yield of 5% elemental carbon or less by weight, and a residual mass of less than 1% by weight. As used herein, char yield is defined as the weight of the carbon remaining expressed as a percentage of the total starting weight of the fiber or resin when the fiber material or resin material is heated (or pyrolyzed) in an inert atmosphere (e.g., nitrogen or argon) at temperatures of up to about 1000 degrees Celsius (about 1832 degrees fahrenheit). As used herein, residual mass is defined as the weight of the fiber remaining expressed as a percentage of the total weight of the starting fiber when the fiber material is heated (or oxidized) in an oxidizing atmosphere (e.g., air, or oxygen) at temperatures of up to about 1000 degrees Celsius (about 1832 degrees fahrenheit). It should be noted that while a residual mass of 1% or less is preferred in the production of carbon-carbon composite structures for high temperature applications, a residual mass of greater than 1% may be acceptable for certain lower temperature applications or in applications where the excessive residual mass and the associated residues do not adversely impact performance.

In various embodiments, the fabric-resin layers may be stacked, in a near net shape tool, with each successive layer containing the desired quantity and/or type of pore former thereby forming a porosity gradient fibrous preform. In various embodiments, the pore former size, quantity, and/or type may be varied such that interior plies of the porosity gradient fibrous preform may contain a lower volume of pore formers while the exterior plies of the porosity gradient fibrous preform may conversely contain a higher volume of pore formers. In various embodiments, during stacking, the fabric-resin layers may be tacked together using a variety of methods, e.g., an adhesive tackifier, a hot iron to locally melt a binder, among others. In various embodiments, as the porosity gradient fibrous preform is stacked, the various fabric-resin layers may be joined through thickness reinforcement (TTR) via needling, tufting, stitching, or z-pinning, using a TTR fiber thread. In various embodiments, once all the fabric-resin layers are stacked, then all the fabric-resin layers are needled, tufted, stitched, or z-pinned together. In various embodiments, as each successive fabric-resin layer is added, then the fabric-resin layers may be needled, tufted, stitched, or z-pinned together. In various embodiments, the needling, tufting, stitching, or z-pinning may penetrate all the fabric-resin layers. In various embodiments, the needling, tufting, stitching, or z-pinning may penetrate only a predefined number of fabric-resin layers. In various embodiments, a number of fabric-resin layers that are needled, tufted, stitched, or z-pinned may vary as the porosity gradient fibrous preform is generated. In various embodiments, once the porosity gradient fibrous preform is completely stacked and needled, the porosity gradient fibrous preform may be placed in a close die mold or vacuum bag tooling and subjected to heat and pressure to consolidate and cure the porosity gradient fibrous preform.

In various embodiments, once consolidation and cure is complete, the porosity gradient fibrous preform may undergo pyrolysis, or heat-treatment in an inert environment (pyrolysis may be alternatively referred to as pyrolyzation), where the pore formers (and in various embodiments the resin) in the porosity gradient fibrous preform are burned, melted, and/or evaporated, and the remaining resin and/or fusible fibers decompose leaving behind a carbon char that forms the matrix to form a porosity gradient preform. In various embodiments, once pyrolysis is complete, the porosity gradient fibrous preform may undergo CVI densification. In various embodiments, once the CVI densification is complete, the porosity gradient fibrous preform may undergo skim cut machining where the surface of the porosity gradient fibrous preform is modified to meet a set of standards for the porosity gradient fibrous preform. In various embodiments, the pyrolysis, CVI densification and skim cutting may be repeated until a desired part density is reached. In various embodiments, once the desired part density is reached, a final machining may be performed on the porosity gradient fibrous preform to meet desired porosity gradient fibrous preform dimensions.

Figure 1A:
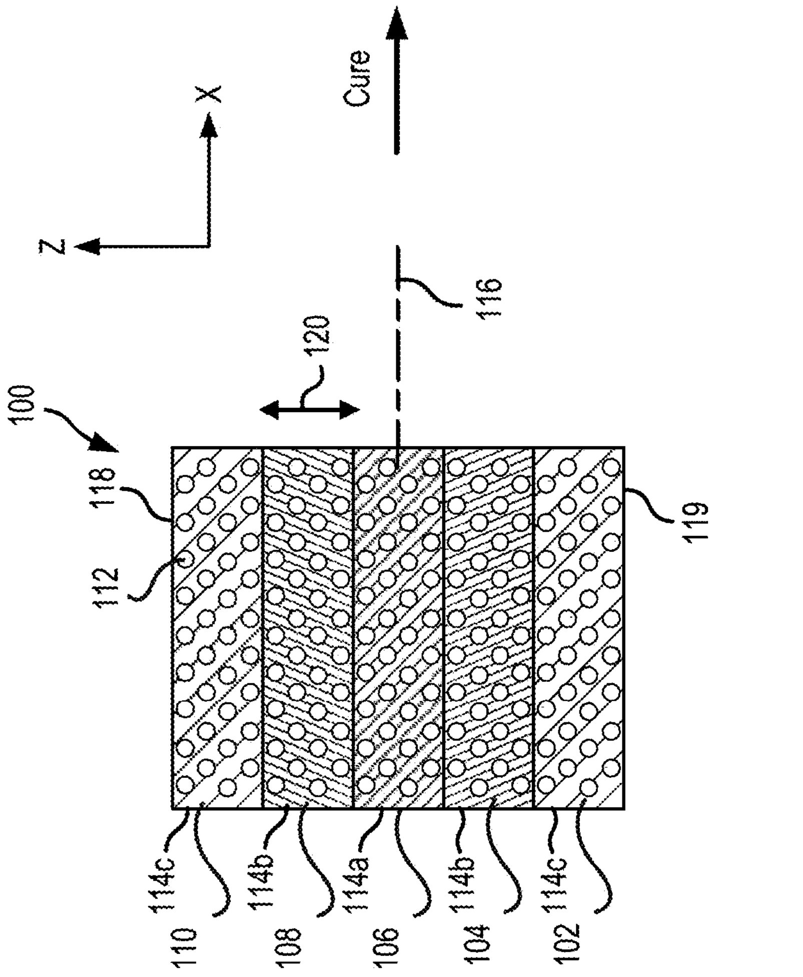

With reference to FIG. 1A, in accordance with various embodiments, a porosity gradient fibrous preform 100 using fabric-resin layers having varying types and/or compositions that result in sequentially increasing porosities is illustrated. In various embodiments, each of the fabric-resin layers 102, 104, 106, 108, and 110 can have a consistent volume of fibers 112 (e.g., carbon fibers). Stated differently, a fiber volume of the plurality of fibers 112 for each fabric-resin layer 102, 104, 106, 108, and 110 can be uniform throughout the porosity gradient fibrous preform 100. In various embodiments, fiber volume is greater than 10% of the total volume of the preform 100. In various embodiments, fiber volume is greater than 25% of the total volume of the preform 100. In various embodiments, fiber volume can be between 30% and 50% for carbon-carbon or ceramic composites, and up to 60% for thermoset composites. Each of the fabric-resin layers 102, 104, 106, 108, and 110 includes a resin (e.g., fabric-resin layer 106 includes a first resin 114*a*, fabric-resin layer 104 and fabric-resin layer 108 include a second resin 114*b*, and fabric-resin layer 102 and fabric-resin layer 110 include a third resin 114*c*; collectively referred to herein as resin 114). In this regard, each of the fabric-resin layers 102, 104, 106, 108, and 110 can be referred to herein as fabric-resin layers. Stated differently, each of the fabric-resin layers 102, 104, 106, 108, and 110 include a plurality of fibers 112 and a resin 114. Each of the fabric-resin layers 102, 104, 106, 108, and 110 can include the plurality of fibers 112 pre-impregnated with the resin 114 (i.e., the fibers 112 can be wetted with the resin 114 prior to the layers being stacked). Stated differently, each of the fabric-resin layers 102, 104, 106, 108, and 110 can be made of a composite prepreg ply. The resin 114, in accordance with various embodiments, can be a thermoset resin such as a phenolic resin, an epoxy resin, a vinyl ester resin, a polyester resin, a polyimide resin, a benzoxazine resin, a cyanate ester resin, or a bismaleimide (BMI) resin, among others. The resin 114 can be a fusible resin (i.e., having a char yield of greater than 25%). In various embodiments, the resin 114 can include a polyamide resin, such as a dimer acid-based (DAB) polyamide or a polyamide-epichlorohydrin (PAE) resin.

In various embodiments, first resin 114*a* is the same type of resin as second resin 114*b* and/or third resin 114*c* (e.g., each resin 114 can be a phenolic resin or an epoxy resin, etc., but includes a different moisture content). For example, the third resin 114*c* can include a higher moisture content than the second resin 114*b*. Furthermore, the second resin 114*b* can include a higher moisture content than the first resin 114*a*. At room temperature, the porosity of the resins 114 can be similar for each fabric-resin layer 102, 104, 106, 108, and 110. However, in response to being heated from a first temperature (e.g., room temperature (e.g., 23° C. (73° F.))) to a second temperature (e.g., a cure temperature (e.g., between 100° C. (212° F.) and 400° C. (752° F.))) the moisture can separate from the resin 114. For example, FIG. 1B depicts a heat, depicted by arrows 121, being applied to heat the preform 100 to a cure temperature, thereby causing pore formers 115 (e.g., moisture) to separate from the resin 114. For example, the resin 114 can phase separate into a first phase that includes a fusible component (e.g., a fusible resin) and a second phase that includes a fugitive component (e.g., a fugitive resin or other material such as water). In this regard, resin 114 can comprise a single phase material at the first temperature and separates into two distinct materials at the second temperature. The phase separation of the resin 114 can be a polymerization-induced phase separation, in accordance with various embodiments.

In various embodiments, the volume of pore formers 115*b* is greater than the volume of pore formers 115*a*. The higher volume of pore formers 115*b* creates a higher porosity in the fabric-resin layer 110 and fabric-resin layer 102 than the porosity of fabric-resin layer 108 and fabric-resin layer 104. The higher volume of pore formers 115*b* can be achieved by having a greater quantity of pore formers **115*b* than the quantity of pore formers 115*a*, in accordance with various embodiments. The higher volume of pore formers 115*b* can be achieved by having a pore formers 115*b* that are each greater in size than the size of the pore formers 115*a***, in accordance with various embodiments.

In various embodiments, first resin **114*a* is a different type of resin from that of second resin 114*b* and/or third resin 114*c* (e.g., resin 114*a* can be a first type of resin such as an epoxy resin and resin 114*b* and/or resin 114*c* can be a second and/or third type of resin, such as a phenolic resin and/or a BMI resin, etc. In various embodiments, resin 114*a*, resin 114*b*, and/or resin 114*c* can comprise a single phase resin at the first temperature (e.g., a room temperature) and can be configured to separate into two phases in response to being heated to the second temperature (e.g., a cure temperature). For example, the resin 114 can phase separate into a first phase that includes a fusible component (e.g., a fusible resin) and a second phase that includes a fugitive component (e.g., a fugitive resin or other material such as water). In this regard pore formers 115** can be a fugitive resin, in accordance with various embodiments.

In various embodiments, first resin **114*a* is a fusible resin and second resin 114*b* and third resin 114*c* are a mixture of fusible resin and fugitive resin, where the ratio of fugitive resin to fusible resin sequentially increases with the distance of each fabric-resin layer away from centerline 116. Stated differently, third resin 114*c* can include a first ratio of fugitive resin to fusible resin that is greater than a second ratio of fugitive resin to fusible resin of second resin 114*b***.

Accordingly, at the second temperature (see FIG. 1B) the preform 100 includes varying quantities of pore formers 115 in each of the fabric-resin layers 102, 104, 106, 108, and 110. For example, fabric-resin layer 108 and fabric-resin layer 104 can include a first plurality of pore formers **115*a* and fabric-resin layer 102 and fabric-resin layer 110 can include a second plurality of pore formers 115*b*, wherein pore formers 115*a* and pore formers 115*b* are collectively referred to herein as pore formers 115. In various embodiments, pore formers 115*a* and pore formers 115*b* are similar in size, wherein the quantity of the pore formers 115*b* is greater than the quantity of the pore formers 115*a*. In various embodiments, pore formers 115*a* and pore formers 115*b* are similar in quantity, wherein the size of the pore formers 115*b* is greater than the size of the pore formers 115*a*. In this regard, the total volume of pore formers 115*b* can be greater than the total volume of pore formers 115*a* so as to create higher porosity in fabric-resin layer 110 and fabric-resin layer 102 than that of fabric-resin layer 108 fabric-resin layer 104. Stated differently, a volume of the pore formers 115 sequentially increases from a center (e.g., at centerline 116) of the porosity gradient fibrous preform 100 toward the outer surfaces (i.e., outer surface 118 and outer surface 119) of the porosity gradient fibrous preform 100. In various embodiments, the volume of pore formers 115 increases incrementally with each resin-fabric-resin layer (e.g., the volume of pore formers 115*a* is greater than the volume of pore formers in fabric-resin layer 106 (which can be zero in various embodiments) and the volume of pore formers 115*b* is greater than the volume of pore formers 115*a*). In various embodiments, the volume of pore formers 115** of each fabric-resin layer is uniform along the x-direction.

In various embodiments, upon being cured, the resins 114 and pore formers 115 create a sequentially increasing porosity to create a path through the porosity gradient fibrous preform 100 for infiltration of a fluid, as described in further detail herein. Stated differently, a quantity of pore formers 115 is selected so that the porosity sequentially increases from a center of the porosity gradient fibrous preform 100 toward an outer surface (e.g., outer surface 118 and/or outer surface 119) of the porosity gradient fibrous preform 100. In this manner, a porosity of the resin 114, after being cured, corresponds with a position of the resin 114 with respect to centerline 116 (i.e., increasing porosity with distance of the resin 114 from the centerline 116).

In various embodiments, the pore formers 115 are fugitive pore formers. Stated differently, when heated to a pyrolysis temperature, the pore formers 115 can be burned, melted, or evaporated (and in their place are created pores in the resin matrix), and the remaining portion of the resin 114 is pyrolyzed into a carbon matrix to create a path (i.e., with the pores) through the thickness of the porosity gradient fibrous preform 100 for infiltration of fluids. In this regard, pore formers 115 are made of a fugitive material. Pore formers 115 can be made of a fugitive material such as a fugitive resin, a solvent (e.g., toluene, xylene, methyl iso-butyl ketone, n-butyl acetate, or cellosolve acetate, or the like), and/or a moisture such as water.

By increasing the pore former volume near the exterior of the porosity gradient fibrous preform 100, a porosity of the porosity gradient fibrous preform 100 increases—e.g., during or after a pyrolysis process as described herein—near the exterior of the porosity gradient fibrous preform 100 to thereby allow a fluid to infiltrate the interior of the porosity gradient fibrous preform 100 during a CVI process, as described herein, and thereby achieve more uniform and/or increased part density.

Although illustrated as having five fabric-resin layers 102, 104, 106, 108, and 110, it should be understood that any number of fabric-resin layers can be used to form the fibrous preform 100, so long as the fabric-resin layers are chosen to have increasing porosity from the centerline 116 toward the outer surface 118. In various embodiments, once the desired number of layers has been reached for the preform ply stack, fabric-resin layers 102, 104, 106, 108, and 110 may be joined through thickness reinforcement (TTR) via external needling, tufting, stitching, or z-pinning, among others. In various embodiments, the TTR utilizes a TTR fiber thread that includes fugitive fibers, fusible fibers, and/or carbon fibers. In various embodiments, the TTR is performed in a uniform manner such that a number of needles, tufts, stiches, or z-pins are consistent along a length of the fabric-resin layers 102, 104, 106, 108, and 110 in the x-direction. In various embodiments, a transport depth in the z-direction of the TTR is through all the fabric-resin layers 102, 104, 106, 108, and 110 of the porosity gradient fibrous preform for the length of the porosity gradient fibrous preform in the x-direction. In various embodiments, generating a TTR fibrous preform in this manner takes advantage of random fiber placement for uniform densification in the through thickness direction, while maintaining high in-plane strengths.

Figure 2:
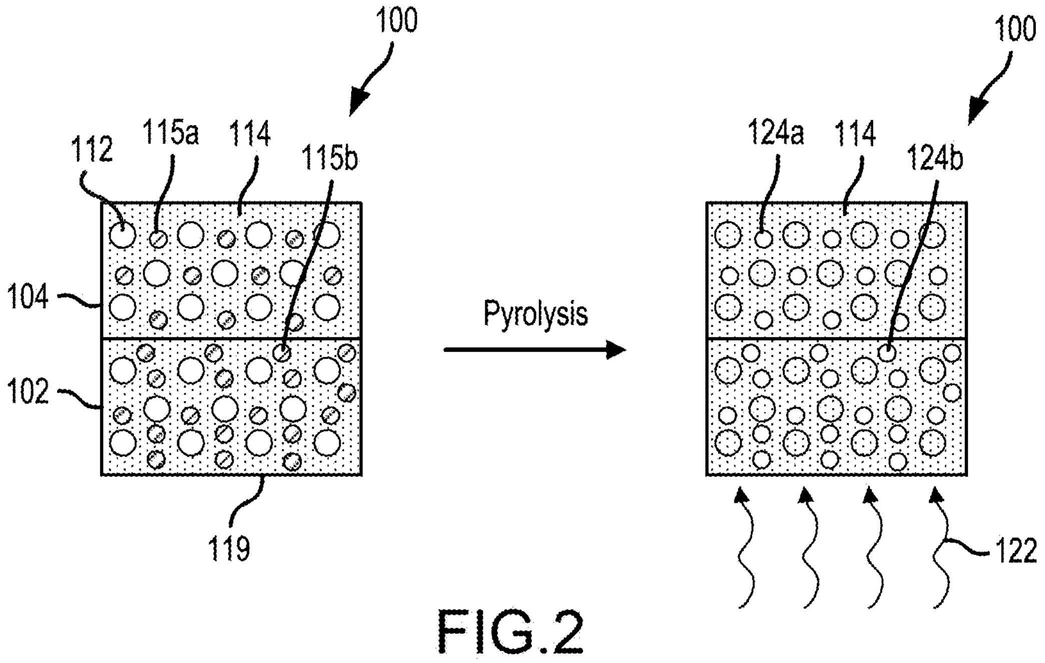
FIG. 2 illustrates two fabric-resin layers of a cured porosity gradient fibrous preform having different quantities of pore formers and undergoing a pyrolysis step thereby forming a first porosity in a first fabric-resin layer and a second porosity in a second fabric-resin layer, in accordance with various embodiments.

In various embodiments, each fabric-resin layer 102, 104, 106, 108, and 110 has a directionality that coincides with the direction of the fibers 112. The directionality of adjacent fabric-resin layers (e.g., fabric-resin layer 106 and fabric-resin layer 108) can be the same, in accordance with various embodiments. The directionality of adjacent fabric-resin layers (e.g., fabric-resin layer 106 and fabric-resin layer 108) can differ, in accordance with various embodiments FIG. 2 illustrates a porosity gradient fibrous preform 100, having already undergone the curing step, undergoing a pyrolysis process, in accordance with various embodiments. In the illustrated embodiment, only fabric-resin layer 102 and fabric-resin layer 104 are shown for ease of illustration.

However, it should be understood that porosity gradient fibrous preform 100 can include any number of fabric-resin layers with a sequentially decreasing volume of pore formers, for example including fabric-resin layers 106, 108, and 110, without departing from the scope of the present disclosure. The preform 100 undergoes the pyrolysis step by applying heat—illustrated by arrows 122—to the preform 100 where the pore formers 115 are burned, melted, or evaporated (thereby creating pores 124*a* and pores 124*b*; collectively referred to as pores 124) to create a path (i.e., with the pores 124) through the thickness of the preform 100 for infiltration of fluids during a CVI process. In this regard, the porosity of the preform 100 can be selected based upon the quantity and/or volume of the pore formers 115. In FIG. 2, the pore formers 115*a* are illustrated as having a similar size as pore formers 115*a* but a smaller quantity than pore formers 115*b*; however it should be understood that the pore formers 115*a* could be provided at a similar quantity as pore formers 115*a* but a smaller size than pore formers 115*b* to also achieve the porosity gradient.

In various embodiments, the quantity and/or volume of the pore formers 115 is selected such that the ratio of pore formers 115 to resin 114 and fibers 112 in the fabric-resin layer 102 is Z % by volume, where Z % is 50% or less. In various embodiments, the quantity and/or volume of the pore formers 115 is selected such that the ratio of pore formers 115 to resin 114 and fibers 112 in fabric-resin layer 104 is Y % by volume, where Y % is less than Z %. In various embodiments, the quantity and/or volume of the pore formers 115 is selected such that the ratio of pore formers 115 to resin 114 and fibers 112 in fabric-resin layer 106 is between 0% and X % by volume, where X % is less than Y %.

Figure 3:
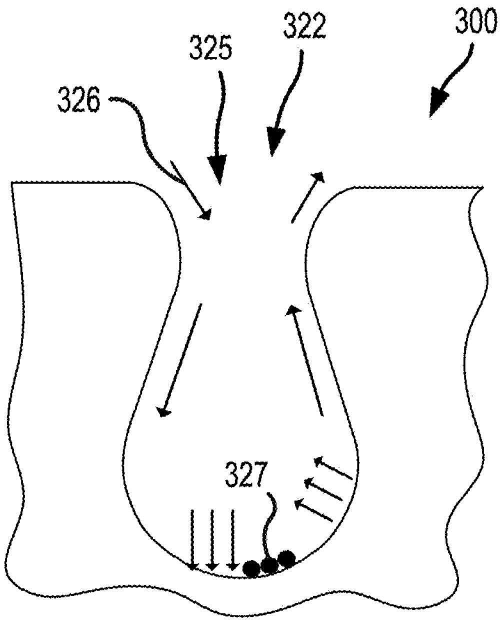
FIG. 3 illustrates a schematic view a pore of a porosity gradient fibrous preform during a Chemical Vapor Infiltration (CVI) process, in accordance with various embodiments.

With momentary reference to FIG. 3, a portion of a porosity gradient fibrous preform 300 is illustrated during a CVI process. The porosity gradient fibrous preform 300 has a pore 322 defining a path 325 for a fluid—illustrated by the arrows 326—to infiltrate the porosity gradient fibrous preform 300. The pore 322 can be created using a pore former as described herein (i.e., the pore 322 can be left over after the pore former is pyrolyzed). Accordingly, the pore formers 115 are interconnected across the fabric-resin layers such that, in response to being pyrolyzed, the path 325 is created through the fabric-resin layers to allow a fluid (e.g., a CVI gas) to infiltrate through the thickness (e.g., the entire thickness) of the porosity gradient fibrous preform 300. The fluid 326 can be a hydrocarbon gas configured to infiltrate the preform at elevated temperatures (e.g., approximately 1000° C. (1832° F.), wherein the term "approximately in this regard means±200° C. (between 1472° F.-2192° F.)), whereby carbon 327 from the hydrocarbon gases separate from the gas and is deposited on and within the porosity gradient fibrous preform 300. In this regard, it should be appreciated that the increased porosity located near the outside surface of the porosity gradient fibrous preform results in additional paths whereby the fluid (e.g., hydrocarbon gases) can reach the interior of the porosity gradient fibrous preform to deposit carbon. As the porosity of the porosity gradient fibrous preform is decreased in the interior of the porosity gradient fibrous preform due to the deposited carbon during CVI, the fluid continues to fill the pores located near the outside surface of the porosity gradient fibrous preform, similarly decreasing porosity near the exterior of the porosity gradient fibrous preform, thereby resulting in an overall uniformly higher density carbon-carbon component than if the porosity gradient hadn't existed in the first place. Stated differently, and with momentary additional reference to FIG. 5, during CVI, the pores 524 are not filled (or otherwise clogged from allowing CVI gasses to infiltrated the interior of the porosity gradient fibrous preform) with carbon deposited by the CVI fluid 326 until after the interior of the porosity gradient fibrous preform reaches a desired density. In this manner, the porosity gradient fibrous preform allows for uniform densification by providing additional and/or larger pathways for the CVI gasses to reach the interior of the porosity gradient fibrous preform.

Figure 4:
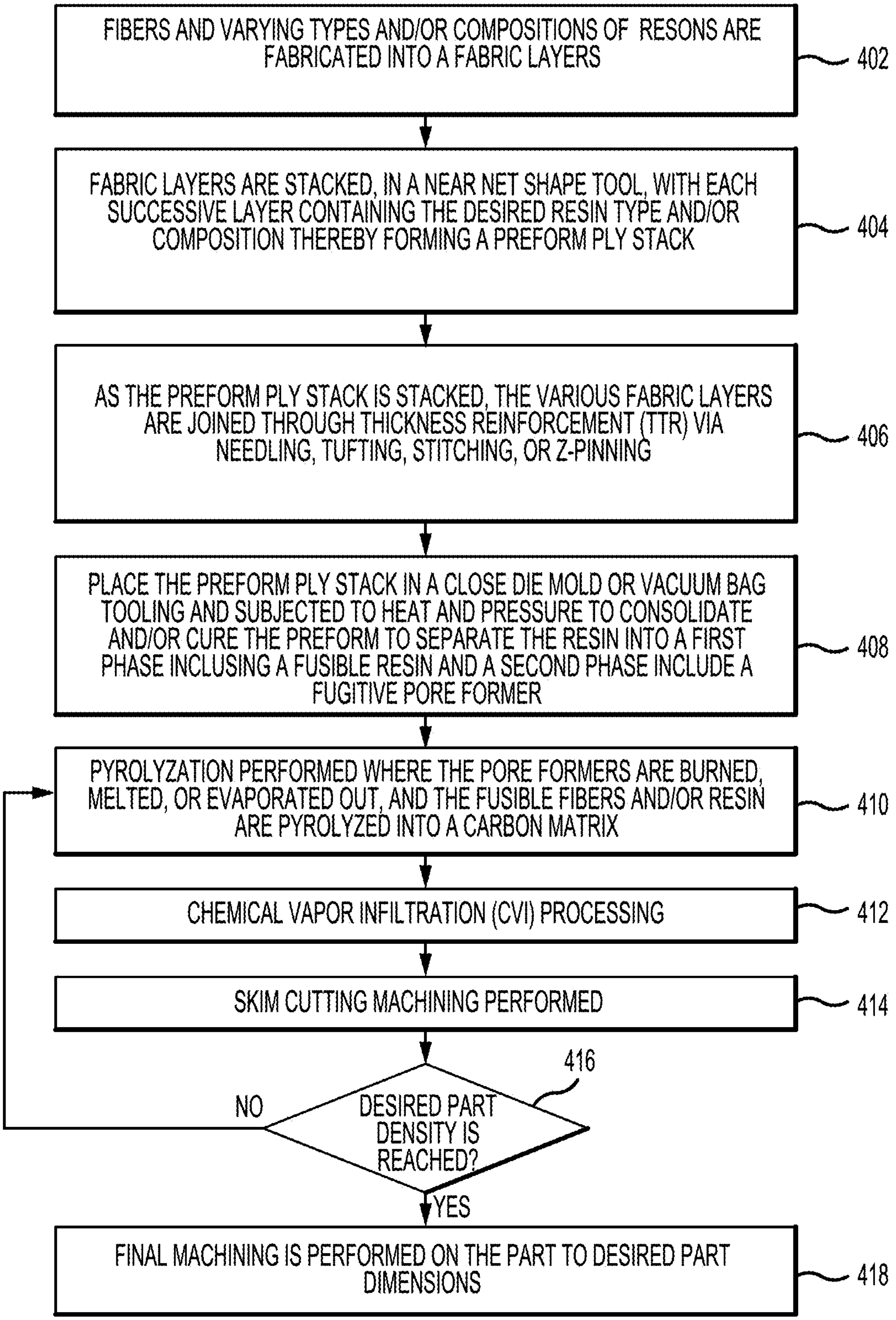
FIG. 4 illustrates a method of forming a porosity gradient fibrous preform for a high temperature composite, in accordance with various embodiments.

Referring now to FIG. 4, in accordance with various embodiments, a method of forming a porosity gradient fibrous preform for a high temperature composite is illustrated. At block 402, fabric-resin layers using uniform fiber volume and varying types and/or compositions of resins are fabricated into a fabric-resin layers of either woven fabric-resin layers, non-crimp fabric-resin layers, such as unidirectional or stitched unidirectional, or felt fabric-resin layers. At block 404, the fabric-resin layers are stacked, in a near net shape tool, with each successive layer containing the desired resin type and/or composition thereby forming a porosity gradient fibrous preform. At block 406, as the porosity gradient fibrous preform is stacked, the various fabric-resin layers may be joined through thickness reinforcement (TTR) via needling, tufting, stitching, or z-pinning, using a TTR fiber thread that includes fugitive fibers, fusible fibers, and/or carbon fibers. It should be understood that the TTR step at block 406 is optional and can be omitted in various embodiments. At block 408, once the porosity gradient fibrous preform is completely stacked (and needled if desired), the porosity gradient fibrous preform may be placed in a close die mold or vacuum bag tooling and subjected to heat and pressure to consolidate the porosity gradient fibrous preform. In various embodiments, the resin in the porosity gradient fibrous preform is cured (e.g., during or after consolidation) by applying heat and pressure to the resin 114. The porosity gradient fibrous preform can be heated to a cure temperature of between 93° C. (200° F.) and 121° C. (250° F.); though the cure temperature can vary depending on the composition of the resin 114. For example, various thermoset resins may have a cure temperature of between 260° C. (500° F.) and 371° C. (700° F.). In this regard, it should be understood that the cure temperate is chosen depending on the type of resin used. Accordingly, the porosity gradient fibrous preform can be heated to a cure temperature of between 93° C. (200° F.) and 371° C. (700° F.), in accordance with various embodiments. After being cured, the resin 114 can be polymerized (i.e., the resin includes monomers before being cured and includes polymers after being cured). In various embodiments, different resin types and/or compositions are used for different layers of the ply stack, as described herein, to achieve increasing porosity from the interior toward the exterior of the preform, thereby creating paths for receiving a fluid during the CVI densification step. Upon being heated to the cure temperature, the resins phase separate into a first phase comprising a fusible resin and a second phase comprising a fugitive pore former, according to the selected type and/or composition of the resin. In embodiments where the pore former is a moisture such as water, the water can be evaporated from the preform (e.g., by heating the preform) thereby leaving behind pores in the resin which form the path for receiving a fluid (e.g., during CVI).

At block 410, once consolidation is complete, the porosity gradient fibrous preform undergoes pyrolysis where the pore formers (which were formed at the curing stage)—and in various embodiments a portion of the resin and/or fugitive fibers (if any fugitive fibers exist—in the porosity gradient fibrous preform are burned, melted, or evaporated, and the remaining portion of the resin and the fusible fibers are pyrolyzed into a carbon matrix and create a path through the thickness of the porosity gradient fibrous preform for infiltration of fluids. Subsequent to pyrolysis, the weight ratio percentage of the resin 114 (which at this point is carbon char (i.e., carbon)) in fabric layer 106 can be between 30% and 50%, between 35% and 45%, between 37% and 43%, or between 35% and 50%, in accordance with various embodiments. In various embodiments, the weight ratio percentage of the resin 114 (which at this point is carbon char (i.e., carbon)) in fabric layer 104 and/or fabric layer 108 is between 25% and 40%, between 28% and 38%, or between 30% and 35%, in accordance with various embodiments. In various embodiments, the weight ratio percentage of the resin 114 (which at this point is carbon char (i.e., carbon)) in fabric layer 102 and/or fabric layer 110 is between 20% and 35%, between 20% and 30%, or between 20% and 28%, in accordance with various embodiments.

At block 412, once pyrolysis is complete, the porosity gradient fibrous preform may undergo CVI densification (e.g., see FIG. 3). At block 414, once the CVI densification is complete, the porosity gradient fibrous preform may undergo skim cut machining where the surface of the porosity gradient fibrous preform modified to meet a set of standards for the porosity gradient fibrous preform. At block 416 a determination is made as to whether a desired part density is reached. If at block 416 the desired part density has not been reached, the operation returns to block 410. If at block 416 the desired part density has been reached, then, at block 418, a final machining may be performed on the porosity gradient fibrous preform to meet desired porosity gradient fibrous preform dimensions.

Therefore, the illustrative embodiments provide for the creation of complex contour fibrous preforms, with a variety of thicknesses, which take advantage of porosity gradient created by varying resin type and or quantity to generate pore formers of desired volume at the cure stage. The porosity gradient preform construction of the present disclosure tends to improve part quality and make the CVI process more effective. The porosity gradient tends to enable higher densification yields in thick sections or complex contour geometries.

Figure 5:
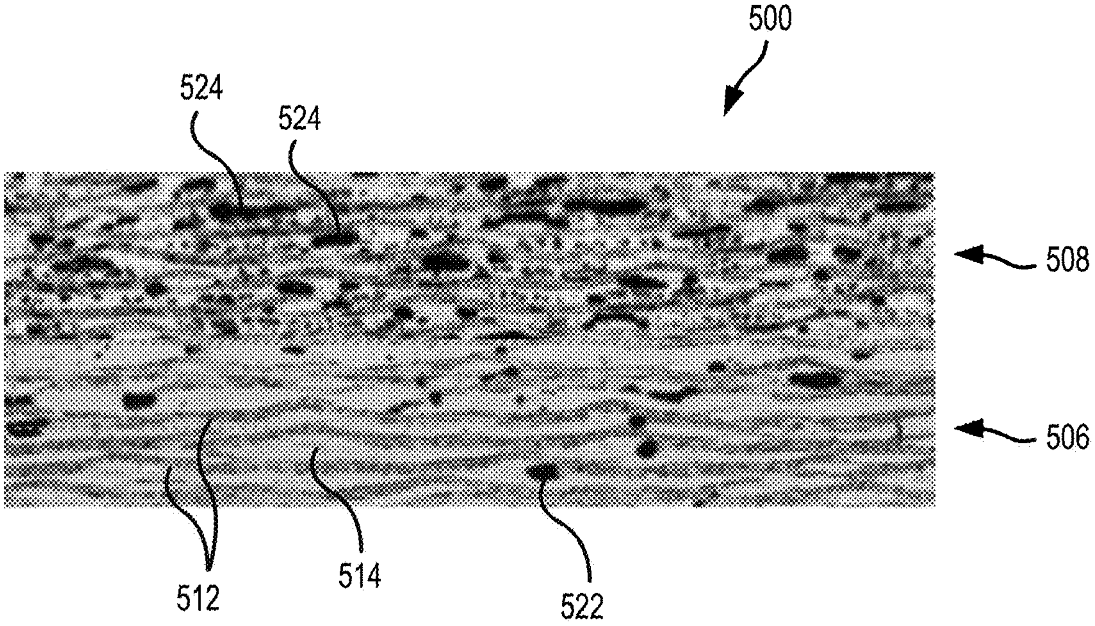
FIG. 5 illustrates a micro cross-section picture of a porosity gradient fibrous preform, in accordance with various embodiments.

With reference to FIG. 5, a micro cross-section picture of a porosity gradient fibrous preform 500 manufactured using the systems and methods of the present disclosure (before undergoing CVI) is illustrated having uniform fiber volume and also having a porosity gradient. Porosity gradient fibrous preform 500 includes a carbon or ceramic matrix 514 reinforced with carbon or reinforcement fibers 512. The carbon or ceramic matrix 514 can be the product of a resin (e.g., see resin 114 of FIG. 1) after undergoing curing and pyrolysis. The carbon fibers 512 can be the product of the fibers (e.g., see fibers 112 of FIG. 1) after undergoing pyrolysis. Due to the varying volume of pore formers in each of the layers of the porosity gradient preform, a porosity of a first fabric-resin layer 506 near a center of the preform is less than a porosity of a second fabric-resin layer 508 near an outer surface of the preform. Stated differently, the layer 508 includes a first plurality of pores 524 that create one or more paths through the porosity gradient fibrous preform for infiltration of a fluid (e.g., a fluid used during CVI for densification). The layer 506 includes a second plurality of pores 522 that create one or more paths through the porosity gradient fibrous preform for infiltration of a fluid (e.g., a fluid used during CVI for densification). The pores 524 can be in fluid communication with pores 522 whereby a network of paths are created for receiving a fluid used during CVI densification. A volume of the first plurality of pores 524 is greater than a volume of the second plurality of pores 522. Stated differently, the layer 506 is less porous than the layer 508. Accordingly, the network of paths creates the porosity gradient.

Figure 6:
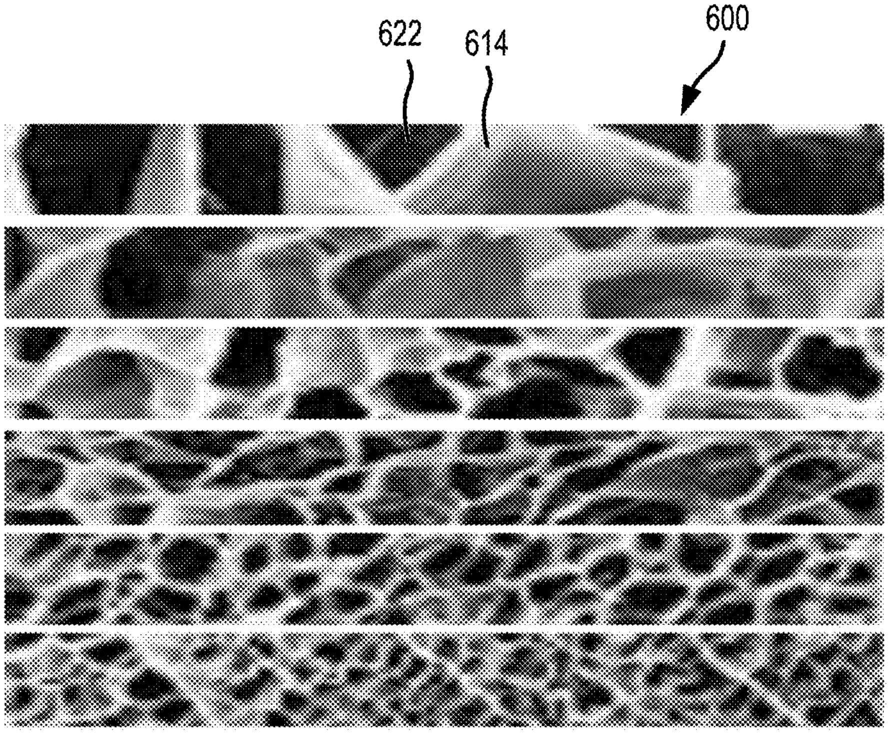
FIG. 6 illustrates a micro cross-section picture of a porosity gradient fibrous preform, in accordance with various embodiments.

With reference to FIG. 6, a micro cross-section picture of a high temperature composite preform 600 manufactured using the systems and methods of the present disclosure (before undergoing CVI) is illustrated having uniform fiber volume and also having a porosity gradient. Preform 600 includes a plurality of layers of varying porosities. Preform 600 includes a carbon matrix 614 defining a plurality of pores 622.

Figure 7:
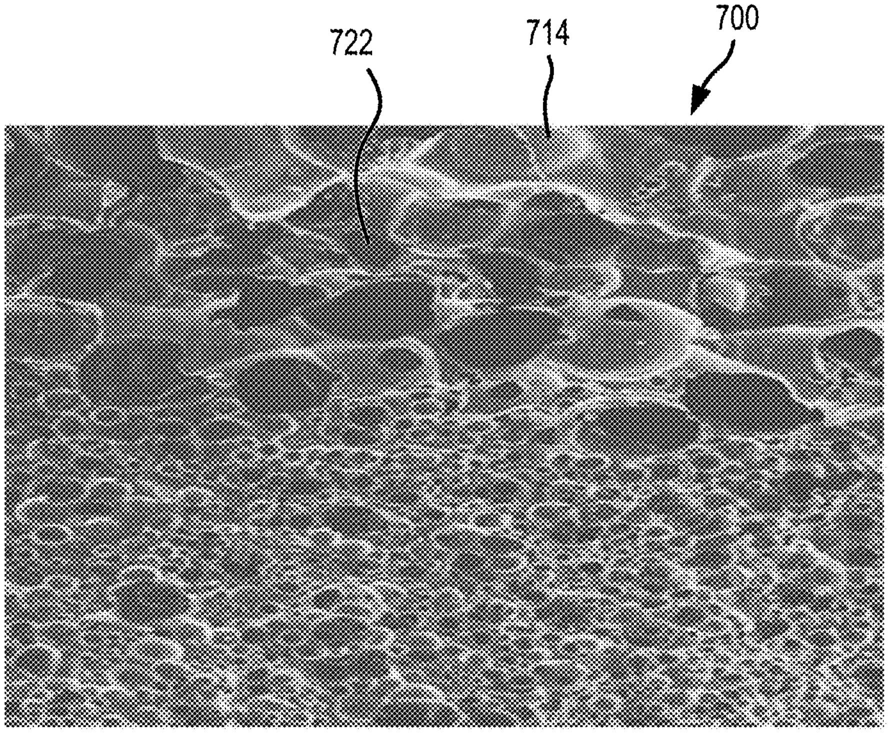
FIG. 7 illustrates a micro cross-section picture of a porosity gradient fibrous preform, in accordance with various embodiments.

With reference to FIG. 7, a micro cross-section picture of a high temperature composite 700 manufactured using the systems and methods of the present disclosure (before undergoing CVI) is illustrated having uniform fiber volume and also having a porosity gradient. Preform 700 includes a plurality of layers of varying porosities. Preform 700 includes a carbon matrix 714 defining a plurality of pores 722.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about," or "approximately" as used herein represent an amount close to the stated amount that still performs a desired function or achieves a desired result. For example, the term "substantially," "about," or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A porosity gradient fibrous preform comprising:

a first fabric-resin layer having a first plurality of fibers and a first resin;

a second fabric-resin layer having a second plurality of fibers and a second resin, the first fabric-resin layer being positioned further outward from a center of the porosity gradient fibrous preform than the second fabric-resin layer;

wherein the first resin comprises a material composition that includes at least one of a thermoset resin, a fusible resin, or a polyamide resin and further includes a fugitive component configured to create a porosity within the first fabric-resin layer, and the fugitive component defines a first plurality of fugitive pore formers;

a composition of the first resin differs from a composition of the second resin so as to produce a porosity gradient across the porosity gradient fibrous preform; and at 23 °C each of the first resin and the second resin is a single-phase material and, at a cure temperature between 100 °C and 400 °C, each undergoes polymerization-induced phase separation into a fusible phase and a fugitive phase.

2. The porosity gradient fibrous preform of claim 1, wherein, in response to the porosity gradient fibrous preform being heated to a curing temperature, the first resin is configured to separate into a first resin component and the first plurality of fugitive pore formers, and the second resin is configured to separate into a second resin component and a second plurality of fugitive pore formers, wherein a volume of the first plurality of fugitive pore formers is greater than a volume of the second plurality of fugitive pore formers.

3. The porosity gradient fibrous preform of claim 2, wherein the first plurality of fugitive pore formers and the second plurality of fugitive pore formers are configured to be pyrolyzed from the porosity gradient fibrous preform, and the first plurality of fugitive pore formers and the second plurality of fugitive pore formers are interconnected across the first fabric-resin layer and the second fabric-resin layer such that, in response to being pyrolyzed, a path is created through the porosity gradient fibrous preform for infiltration of a fluid.

4. The porosity gradient fibrous preform of claim 3, wherein the path creates a porosity gradient in the porosity gradient fibrous preform, and a first porosity of the first fabric-resin layer is greater than a second porosity of the second fabric-resin layer.

5. The porosity gradient fibrous preform of claim 4, wherein the first plurality of fugitive pore formers includes at least one of a moisture content, a solvent, or a fugitive resin.

6. The porosity gradient fibrous preform of claim 5, wherein the solvent comprises at least one of toluene, xylene, methyl isobutyl ketone, n-butyl acetate, or cellosolve acetate.

7. The porosity gradient fibrous preform of claim 4, wherein a fiber volume of the first plurality of fibers and the second plurality of fibers is the same; and a percentage of the fiber volume is at least 25% by volume of the porosity gradient fibrous preform.

8. The porosity gradient fibrous preform of claim 3, wherein removal of the first plurality of fugitive pore formers by pyrolysis yields a porosity gradient configured to promote substantially uniform densification during chemical vapor infiltration.

9. The porosity gradient fibrous preform of claim 1, wherein the second resin comprises a second material composition that includes at least one of the thermoset resin, the fusible resin, or the polyamide resin and further includes a second fugitive component configured to create a second porosity within the second fabric-resin layer, and the second fugitive component defines a second plurality of fugitive pore formers, wherein a volume of the first plurality of fugitive pore formers is greater than a volume of the second plurality of fugitive pore formers.

10. The porosity gradient fibrous preform of claim 1, wherein the first resin includes a first mixture of a fugitive resin and the fusible resin.

11. The porosity gradient fibrous preform of claim 10, wherein the fusible resin comprises one or more polymers having a combined char yield of at least 25 percent by weight and a residual mass of less than 1 percent by weight when heated in an inert and oxidizing atmosphere up to about 1000 °C, and the fugitive resin has a combined char yield of 5 percent or less and a residual mass of less than 1 percent under the same conditions.

12. The porosity gradient fibrous preform of claim 10, wherein the second resin includes a second mixture of the fugitive resin and the fusible resin, and the first mixture includes a first ratio of fugitive resin to fusible resin and the second mixture includes a second ratio of fugitive resin to fusible resin, and the first ratio is greater than the second ratio.

13. The porosity gradient fibrous preform of claim 12, wherein the ratio of the fugitive resin to the fusible resin sequentially increases with distance from the center of the porosity gradient fibrous preform toward an outer surface of the porosity gradient fibrous preform.

14. The porosity gradient fibrous preform of claim 1, wherein the first resin and the second resin are the same type of resin.

15. The porosity gradient fibrous preform of claim 14, wherein the first resin and the second resin both comprise the fusible resin, and the first resin has a moisture content that is different from that of the second resin.

16. The porosity gradient fibrous preform of claim 1, wherein the first resin is a first type of resin and the second resin is a second type of resin different from the first type of resin.

17. The porosity gradient fibrous preform of claim 1, wherein, after pyrolysis in an inert atmosphere up to about 1000 °C, a carbon-char weight percentage of the first fabric-resin layer is between 20 percent and 35 percent, and a carbon-char weight percentage of the second fabric-resin layer is between 30 percent and 50 percent.

18. The porosity gradient fibrous preform of claim 1, wherein the first resin and the second resin are configured such that a carbon-char weight percentage sequentially decreases from the center of the porosity gradient fibrous preform toward an outer surface of the porosity gradient fibrous preform.

19. A porosity gradient fibrous preform comprising:

a first fabric-resin layer having a first plurality of fibers and a first resin; and a second fabric-resin layer having a second plurality of fibers and a second resin, the first fabric-resin layer being positioned further outward from a center of the porosity gradient fibrous preform than the second fabric-resin layer;

wherein:

the first resin comprises a material composition that includes at least one of a thermoset resin, a fusible resin, or a polyamide resin, and further includes a fugitive component configured to create a porosity within the first fabric-resin layer, wherein the fugitive component defines a first plurality of fugitive pore formers;

a composition of the first resin differs from a composition of the second resin so as to produce a porosity gradient across the porosity gradient fibrous preform;

the first resin and the second resin each comprise the fusible resin; and the first resin has a moisture content that differs from a moisture content of the second resin.

20. A porosity gradient fibrous preform comprising:

a first fabric-resin layer having a first plurality of fibers and a first resin;

a second fabric-resin layer having a second plurality of fibers and a second resin, the first fabric-resin layer being positioned further outward from a center of the porosity gradient fibrous preform than the second fabric-resin layer;

wherein the first resin comprises a material composition that includes at least one of a thermoset resin, a fusible resin, or a polyamide resin, and further includes a fugitive component configured to create a porosity within the first fabric-resin layer, wherein the fugitive component defines a first plurality of fugitive pore formers;

a composition of the first resin differs from a composition of the second resin so as to produce a porosity gradient across the porosity gradient fibrous preform; and the first resin includes a mixture of a fugitive resin and the fusible resin.

* * * * *